US007290779B2

(12) United States Patent
Takamoto et al.

(10) Patent No.: US 7,290,779 B2
(45) Date of Patent: Nov. 6, 2007

(54) BICYCLE SHIFT CONTROL APPARATUS THAT CANCELS A TENTATIVE SHIFT

(75) Inventors: Ryuichiro Takamoto, Sakai (JP); Koji Uno, Osaka (JP); Kazuhiro Fujii, Kawachinagano (JP)

(73) Assignee: Shimano, Inc., Sakai, Osaka (JP)

( * ) Notice: Subject to any disclaimer, the term of this patent is extended or adjusted under 35 U.S.C. 154(b) by 265 days.

(21) Appl. No.: 10/711,548

(22) Filed: Sep. 24, 2004

(65) Prior Publication Data

US 2005/0075774 A1 Apr. 7, 2005

(30) Foreign Application Priority Data

Sep. 24, 2003 (JP) ............................. 2003-330912

(51) Int. Cl.
*B62M 1/12* (2006.01)
(52) U.S. Cl. ............... 280/260; 280/261; 474/254; 474/256; 474/153; 474/149; 477/125
(58) Field of Classification Search ............... 280/260, 280/261; 474/254, 256, 153, 149; 477/125
See application file for complete search history.

(56) References Cited

U.S. PATENT DOCUMENTS

| 5,871,417 | A * | 2/1999 | Suzuki ............... 477/43 |
|---|---|---|---|
| 6,774,771 | B2 * | 8/2004 | Takeda ............... 340/432 |
| 6,834,876 | B2 * | 12/2004 | Fukuda ............... 280/261 |
| 6,837,505 | B2 * | 1/2005 | Fujii ............... 280/260 |
| 6,866,279 | B2 * | 3/2005 | Fujii ............... 280/260 |
| 6,877,755 | B2 * | 4/2005 | Takamoto ............... 280/260 |
| 6,931,958 | B2 * | 8/2005 | Takeda ............... 74/336 R |
| 2003/0071436 | A1 * | 4/2003 | Fujii ............... 280/260 |
| 2003/0096674 | A1 * | 5/2003 | Uno ............... 477/115 |
| 2003/0160420 | A1 | 8/2003 | Fukuda |
| 2004/0051273 | A1 * | 3/2004 | Fujii ............... 280/260 |

FOREIGN PATENT DOCUMENTS

| EP | 1304286 A2 | 4/2003 |
|---|---|---|
| EP | 1391376 A2 | 2/2004 |
| EP | 1400440 A2 | 3/2004 |
| JP | 7-229909 A | 8/1995 |
| JP | 9-123978 A | 5/1997 |
| JP | 10-159964 A | 6/1998 |
| JP | 11-147495 A | 6/1999 |
| JP | 2004084950 A * | 3/2004 |

OTHER PUBLICATIONS

European search report for EP 04022572.4, the European application that corresponds to this application, dated Feb. 28, 2007.

* cited by examiner

*Primary Examiner*—Lesley D. Morris
*Assistant Examiner*—Marlon Arce-Diaz
(74) *Attorney, Agent, or Firm*—James A. Deland (57) ABSTRACT

A bicycle shift control apparatus comprises a threshold value setting unit that sets a threshold value of a running condition for shifting a bicycle transmission, a decision unit that decides if a current running condition value passes the threshold value, and a tentative shift unit that sets a tentative shift of the bicycle transmission when the decision unit decides that the current running condition value passes the threshold value. A canceling unit cancels the tentative shift if the decision unit decides that the current running condition value varies from a previous running condition value by a determined value.

21 Claims, 10 Drawing Sheets

|  |  | UPSHIFT THRESHOLD VALUE (U) (km/h) | DOWNSHIFT THRESHOLD VALUE (D) (km/h) |
|---|---|---|---|
| MODE A1 | 1 | 13 | 0 |
| | 2 | 16 | 12 |
| | 3 | 19 | 14 |
| | 4 | 255 | 17 |
| MODE A2 | 1 | 11 | 0 |
| | 2 | 14 | 10 |
| | 3 | 17 | 12 |
| | 4 | 255 | 15 |

| | GEAR SPEED | UPSHIFT THRESHOLD VALUE (U)(rpm) | DOWNSHIFT THRESHOLD VALUE (D)(rpm) |
|---|---|---|---|
| MODE A1 | 1 | 75 | 0 |
| | 2 | 75 | 55 |
| | 3 | 75 | 55 |
| | 4 | 255 | 55 |
| MODE A2 | 1 | 70 | 0 |
| | 2 | 70 | 50 |
| | 3 | 70 | 50 |
| | 4 | 255 | 50 |

Fig. 10

BICYCLE SHIFT CONTROL APPARATUS THAT CANCELS A TENTATIVE SHIFT

BACKGROUND OF THE INVENTION

The present invention is directed to bicycles and, more particularly, to a shift control apparatus for a bicycle transmission.

Bicycles often are equipped with transmissions that provide a plurality of gear ratios to facilitate riding over various terrain. Such transmissions typically comprise either internal or external transmissions. Internal transmissions usually comprise a planetary gear mechanism disposed within the rear wheel hub. External transmissions typically comprise a plurality of sprockets that rotate coaxially with the rear wheel, and a derailleur that switches the drive chain among the plurality of sprockets. In either case, the transmission usually is connected to a shift control lever mounted to the handlebar or to some other convenient location. The rider then may select a desired gear ratio by manually manipulating the shift control lever.

Recently, automatic shift control devices have been developed so that a proper gear ratio may be selected without requiring manual control by the rider. The automatic shift control device typically selects the proper gear ratio based on bicycle speed or crank RPM. When sensing bicycle speed or crank RPM, a magnet is mounted to the bicycle wheel or crank arm, and a reed switch is mounted to the bicycle frame to sense the passage of the magnet and provide a signal pulse upon each revolution of the wheel or crank arm. Bicycle speed may be calculated from the interval between pulses and the diameter of the wheel. The controller for the automatic shift control device establishes an upshift threshold value and a downshift threshold value based on bicycle speed. The controller provides a signal for upshifting the bicycle transmission to the next higher gear ratio when the bicycle speed rises above the upshift threshold value, and the controller provides a signal for downshifting the bicycle transmission to the next lower gear ratio when the bicycle speed falls below the downshift threshold value. The upshift threshold value usually is set to a value slightly higher than the downshift threshold value of the next highest transmission gear. This produces a hysteresis effect so that the bicycle transmission is not rapidly shifted back and forth between adjacent gears, known as chattering, when the bicycle speed hovers near the upshift and downshift threshold values.

Chattering usually is easy to prevent using a hysteresis effect when bicycle speed is calculated from signal pulses that occur at a relatively low frequency of about once per wheel revolution. However, when the frequency of signal pulses is increased by disposing a plurality of magnets circumferentially around the wheel, there is a risk that temporary fluctuations in bicycle speed will cause undesired shifting of the bicycle transmission. For example, when climbing an uphill stretch, bicycle speed may momentarily fluctuate close to the upshift threshold value for a very brief time, thus resulting in unintended upshifting of the bicycle transmission followed by downshifting immediately thereafter. Such unintended shift operations require the rider to frequently change pedaling force in order to maintain the desired speed, thus creating the risk of conflicting with the rider's pedaling rhythm as well as unstable bicycle operation.

To avoid such undesirable operation, automatic shift control devices have been developed wherein upshifting will not occur unless a plurality of signal pulses indicate that the bicycle speed is above the upshift threshold value. Such a device is disclosed in Japanese Unexamined Patent Application No. 2003-120799. In that device, all speed signal pulses that occur during a predetermined time interval must indicate that the bicycle speed is above the upshift threshold value. If so, then upshifting will occur after the predetermined time interval. However, if even one speed signal that occurs during the predetermined time interval indicates that the bicycle speed is below the upshift threshold value, then upshifting will not occur. The net result is that the automatic shift control device will upshift the bicycle transmission only when riding conditions exceed the upshift threshold value for a predetermined time interval, and many instances of unintended upshifting of the bicycle transmission can be prevented even when riding conditions are sensed frequently.

Unfortunately, even with automatic shift control devices that require upshift threshold values to be exceeded for a predetermined time period, there are still instances when unintended upshifting may occur. For example, if the bicycle is descending a slope on a sidewalk at a parking lot exit, accelerating on an uphill stretch by standing up while pedaling, or suddenly accelerating on a flat road, all of the sensor results within the predetermined time interval may indicate that the bicycle speed exceeds the upshift threshold value. However, the resulting upshift may cause the rider to experience discomfort due to a sharp increase in the effort needed to pedal.

SUMMARY OF THE INVENTION

The present invention is directed to various features of a bicycle shift control apparatus. In one embodiment, a bicycle shift control apparatus comprises a threshold value setting unit that sets a threshold value of a running condition for shifting a bicycle transmission, a decision unit that decides if a current running condition value passes the threshold value, and a tentative shift unit that sets a tentative shift of the bicycle transmission when the decision unit decides that the current running condition value passes the threshold value. A canceling unit cancels the tentative shift if the decision unit decides that the current running condition value varies from a previous running condition value by a determined value. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
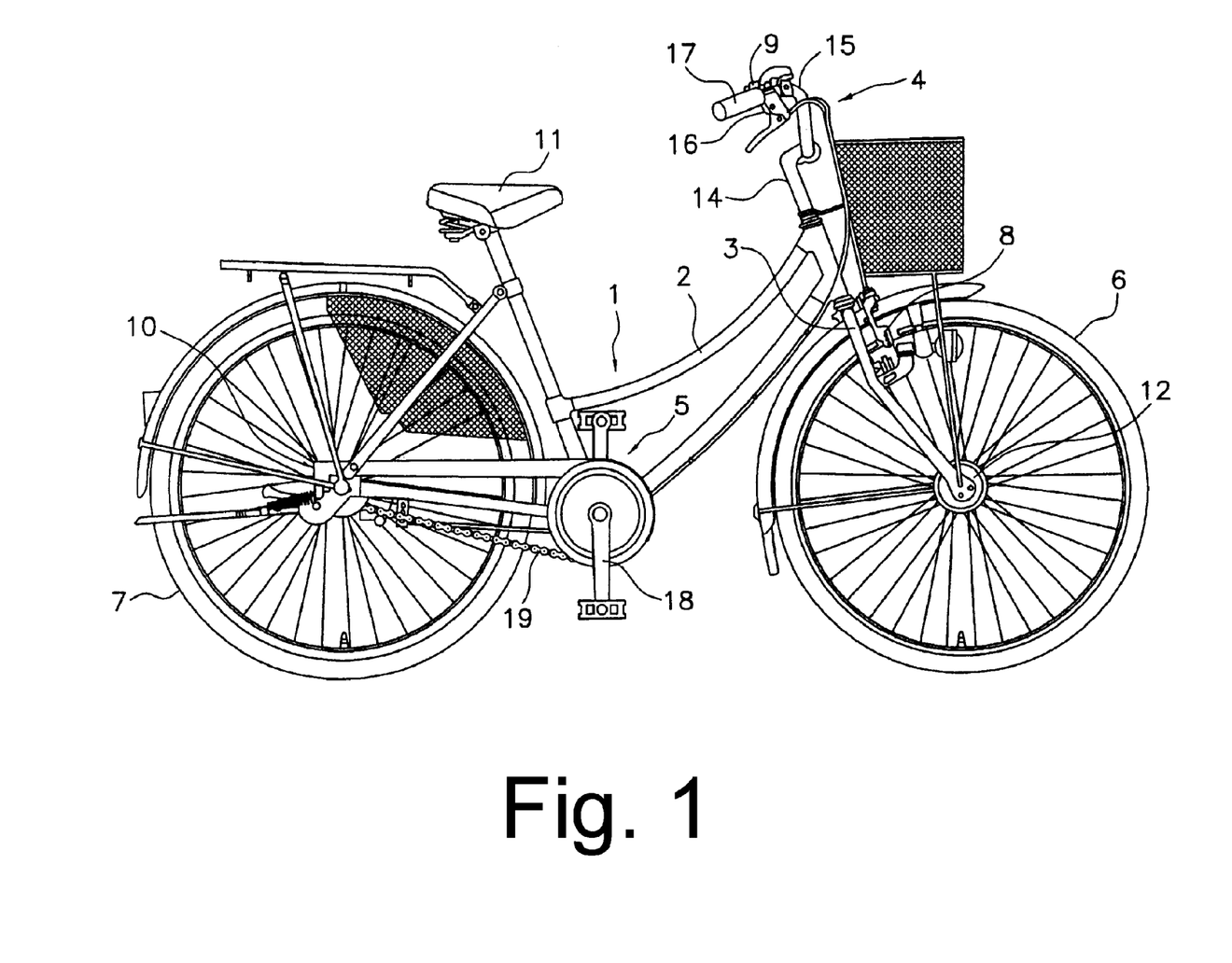
FIG. 1 is a side view of a particular embodiment of a bicycle.

FIG. 1 is a side view of a particular embodiment of a bicycle 1. Bicycle 1 is a recreational bicycle comprising a double-loop frame body 2 formed from welded tubes, a front fork 3 rotatably mounted to frame body 2, a handlebar assembly 4, a drive component 5, a front wheel 6 on which is mounted a dynamo hub 12, a rear wheel 7 on which is mounted a four speed internal shifting hub 10, front and rear brakes 8 (only front brake 8 is shown), a saddle 11, and a shift controller 9 for manually controlling the operation of internal shifting hub 10.

Handlebar assembly 4 comprises a handle stem 14 and a handlebar 15, wherein handle stem 14 is fastened to the upper part of front fork 3, and handlebar 15 is fastened to handle stem 14. Grips 17 and brake levers 16 for operating the respective front and rear brakes 8 are mounted on both ends of handlebar 15. In this embodiment, shift controller 9 is integrated with the right-side brake lever 16.

Figure 3:
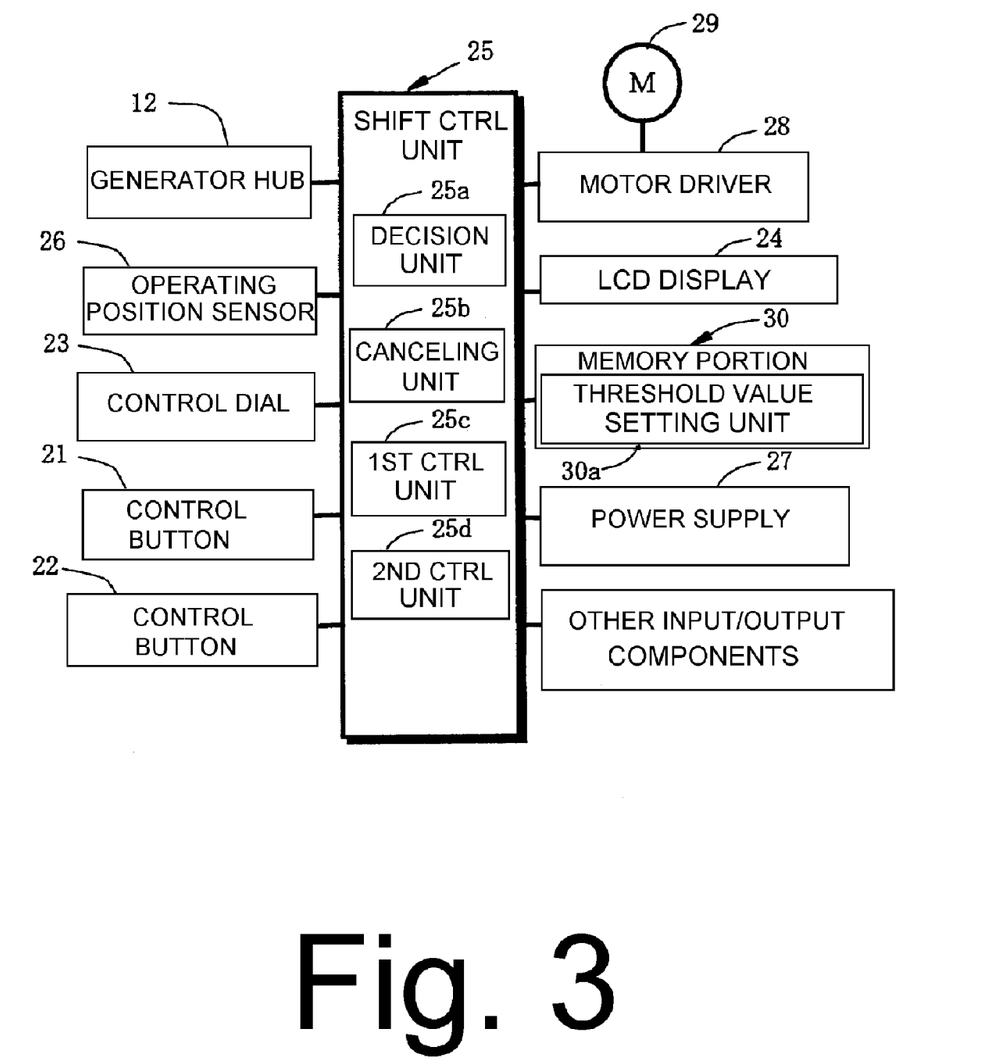
FIG. 3 is a schematic block diagram of a particular embodiment of an electronic control apparatus.

Drive component 5 comprises a crank 18 and a chain 19, wherein crank 18 includes a sprocket and is rotatably mounted on the lower part (bottom bracket component) of frame body 2. Chain 19 engages the sprocket on crank 18 and a sprocket that drives internal shifting hub 10. Internal shifting hub 10 is capable of producing four speeds and a locking position, wherein the four speeds and the locking position may be manually selected by shift controller 9 and effected by a shift motor 29 (FIG. 3). Rotation of rear wheel 7 is restricted when internal shifting hub 10 is in the locking position.

Figure 2:
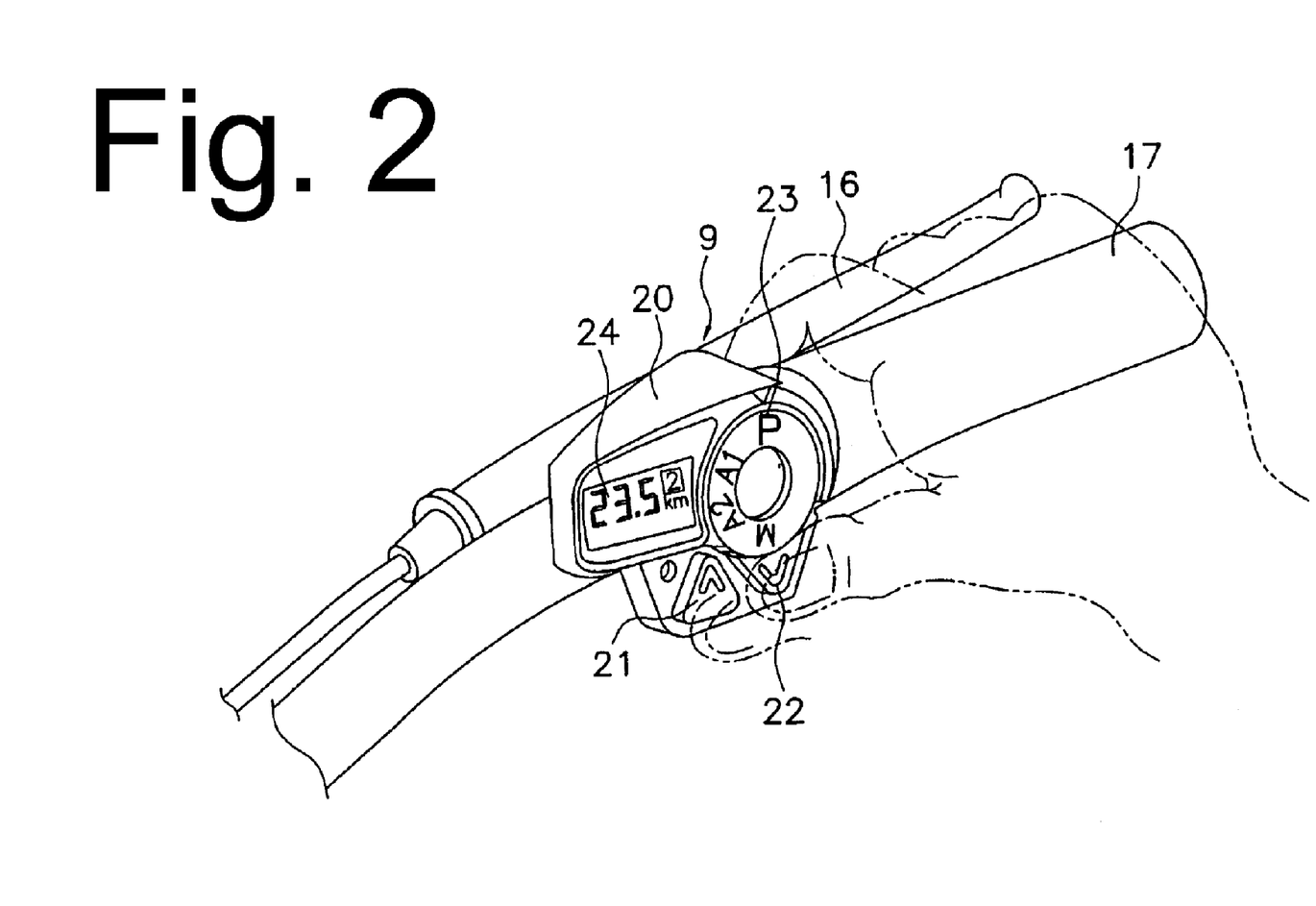
FIG. 2 is a closer view of a particular embodiment of a handlebar mounted shift controller.

As shown in FIG. 2, shift controller 9 comprises a housing 20 that is integrally formed with the right side brake lever 16, two operating buttons 21 and 22 in the form of triangular pushbuttons disposed next to each other on the lower part of housing 20, a control dial 23 disposed above operating buttons 21 and 22, and a liquid crystal display 24 disposed to the left of control dial 23. The operating button 21 on the left side is for manually shifting from a lower speed to a higher speed, and the operating button 22 on the right side is for manually shifting from a higher speed to a lower speed. Control dial 23 is used for switching between a manual shifting mode (M), two automatic shifting modes (A1) and (A2), and a parking mode (P) using four detent positions. A shift control unit 25 (FIG. 3) is disposed within housing 20.

When control dial 23 is set to one of the automatic shifting modes (A1) or (A2), internal shifting hub 10 is automatically shifted based on speed signals from dynamo hub 12. Automatic shifting mode (A1) is used mainly when performing automatic shifting on flat terrain, whereas automatic shifting mode (A2) is used mainly when performing automatic shifting on uphill stretches. Thus, when in automatic shifting mode (A2), shift timing for upshifting is earlier, and shift timing for downshifting is later, than the corresponding shift timing for automatic shifting mode (A1). When control dial 23 is set to manual shifting mode (M), internal shifting hub 10 is shifted to a desired speed through the manipulation of the operating buttons 21 and 22. In all three modes (A1), (A2) and (M), liquid crystal display 24 displays the current travel speed and the current transmission gear. When control dial 23 is set to parking mode (P), internal shifting hub 10 is locked to restrict the rotation of rear wheel 7.

FIG. 3 is a schematic block diagram of a particular embodiment of an electronic control apparatus for controlling the operation of internal shifting hub 10. Shift control unit 25 comprises a microcomputer having a CPU, RAM, ROM, and I/O interface. Shift control unit 25 is operatively coupled to dynamo hub 12 for receiving the speed signals mentioned above, to an operating position sensor 26 comprising a potentiometer or the like for sensing the operating position of internal shifting hub 10, to control dial 23, to operating buttons 21 and 22 and liquid crystal display 24, to a power supply 27, to a motor driver 28 that operates shift motor 29 for changing the speeds of internal shifting hub 10 and placing internal shifting hub 10 in the parking position in response to the operation of control dial 23 and the operating buttons 21 and 22, to a memory 30, and to other I/O components.

Figure 4:
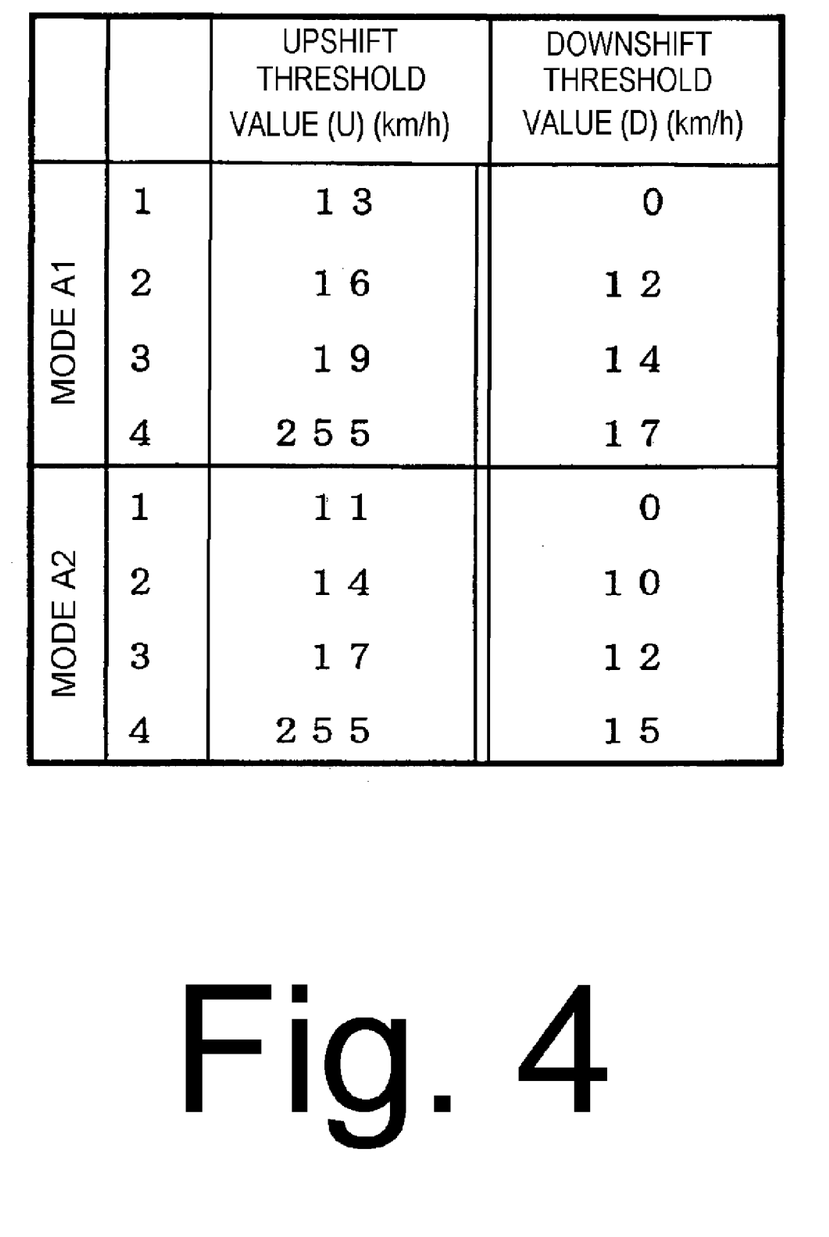
FIG. 4 is a table illustrating a particular embodiment of shift threshold values.

Memory 30 may comprise a rewritable nonvolatile memory such as an EEPROM, and it is used for storing programming code and various types of data such as a password used to change the parking mode, the tire diameter used to calculate the bicycle speed, and so on. Memory 30 also comprises a threshold setting unit 30a that stores upshift and downshift threshold values that indicate the speeds at which internal shifting hub 10 is shifted. FIG. 4 is a table illustrating a particular embodiment of upshift and downshift threshold values that may be stored in threshold setting unit 30a and used to control automatic shifting depending on bicycle speed in the two automatic shifting modes (A1) and (A2).

Shift control unit 25 comprises a decision unit 25a, a canceling unit 25b, a first control unit 25c and a second control unit 25d. Decision unit 25a is programmed to decide if a current running condition value passes an upshift or downshift threshold value and sets a tentative shift of internal shifting hub 10 when it is determined the current running condition value passes the upshift or downshift threshold value. Thus, decision unit 25a also functions as a tentative shift unit. Canceling unit 25b is programmed to cancel the tentative shift if decision unit 25a decides that the current running condition value varies from a previous running condition value by a determined value, or if a current running condition value does not pass the upshift or downshift threshold value. First control portion 25c is programmed to provide a signal to upshift internal shift hub 10 when decision unit 25a decides that a plurality of consecutive running condition values exceed a corresponding upshift threshold value, and second control portion 25d is programmed in this embodiment to provide a signal to immediately downshift internal shift hub 10 when decision unit 25a decides that a running condition value falls below a corresponding downshift threshold value.

Dynamo hub 12 is an alternating current (AC) generator that may have, for example, 28 poles for emitting AC signals in response to the rotation of front wheel 6. Such AC signals may be shaped by a waveform shaping circuit in a known manner and used by shift control unit 25 to calculate a bicycle speed S. In this embodiment, the 28 poles in dynamo hub 12 allow speed to be sensed 14 times per revolution of front wheel 6. This provides much finer control than is possible by sensing speed using a reed switch and a single magnet mounted to the wheel.

Figure 5:
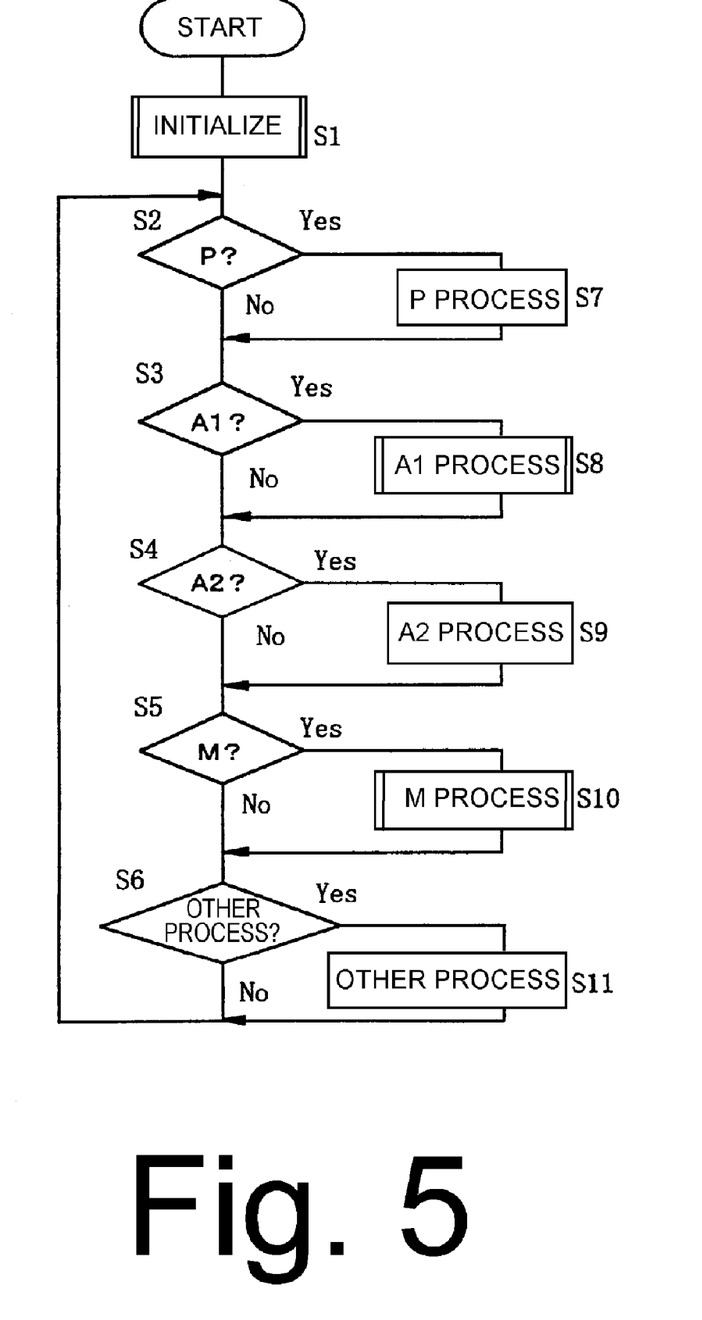
FIG. 5 is a flow chart of a particular embodiment of a main routine.

FIG. 5 is a flow chart of a particular embodiment of a main routine performed by shift control unit 25. The power is turned on for initialization in Step S1. Then, it is determined in a Step S2 whether or not control dial 23 is set to parking mode (P). If so, then a parking process is performed in a Step S7. In that process, operating buttons 21 and 22 may be manipulated to register a password used to release a locked state of internal shifting hub 10, after which motor 29 is operated to move internal shifting hub 10 into the locked position. If internal shifting hub 10 already is in a locked state, operating buttons 21 and 22 may be manipulated to input the previously registered password for releasing the locked state.

In any event, it is then determined in a Step S3 whether or not control dial 23 is set to automatic shifting mode (A1). If so, then an automatic shifting (A1) process described below is performed in a Step S8. In any event, it is then determined in a Step S4 whether or not control dial 23 is set to automatic shifting mode (A2). If so, then an automatic shifting (A2) process similar to automatic shifting (A1) process is performed in a Step S9. In any event, it is then determined in a Step S5 whether or not control dial 23 is set to manual shifting mode (M). If so, then a manual shifting (M) process described below is performed in a Step S10. In any event, it is then determined in a Step S6 whether or not another process has been selected. If so, then the other process is performed in a Step S11. Processing then returns to Step S2.

In general, in the automatic shifting (A1) process of Step S8 (and the automatic shifting (A2) process of Step S9), the operating position VP of internal shifting hub 10 is set to a proper gear position depending on the bicycle speed S and the upshift and downshift threshold values indicated in FIG. 4. If the bicycle speed S passes the upshift or downshift threshold value for the current gear, then shifting is performed in one speed increments to set internal shifting hub 10 in the proper gear position. Downshifting is performed whenever the current bicycle speed falls below the downshift threshold value for the current gear. However, upshifting is performed only when the current bicycle speed S exceeds the upshift threshold value for the current gear a predetermined number of times N and the bicycle has not accelerated rapidly during that time.

Figure 6:
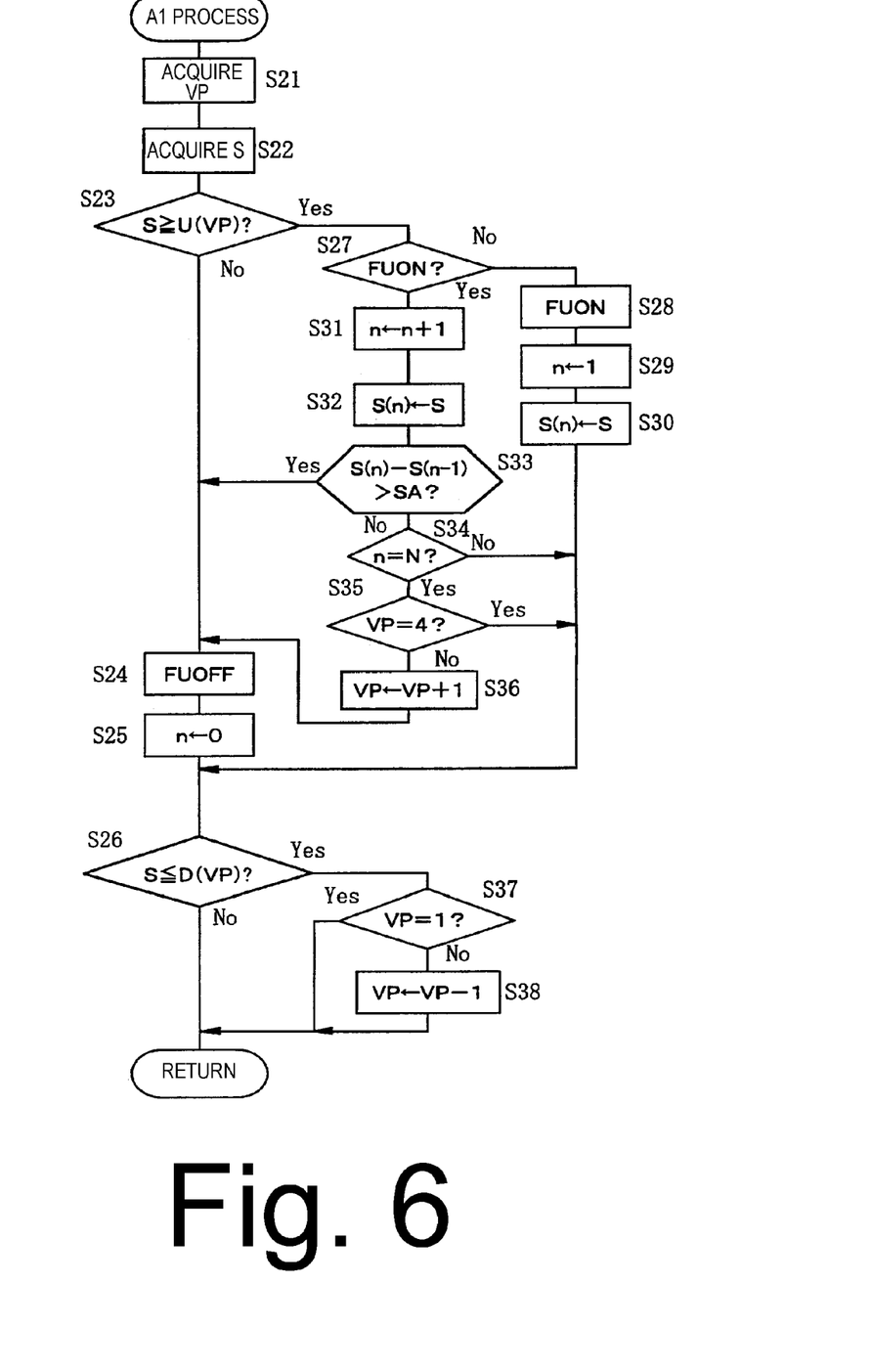
FIG. 6 is a flow chart of a particular embodiment of an automatic shift process.

FIG. 6 is a flow chart of a particular embodiment of automatic shifting (A1) process of Step S8. The automatic shifting (A2) process of Step S9 differs from the automatic shifting (A1) process only by shift threshold values, so a separate description of automatic shifting (A2) process will not be provided. As shown in FIG. 6, the operating position VP of operating position sensor 26 is acquired in a Step S21, and then current speed S of the bicycle is acquired in a Step S22 by means of the speed signal derived from dynamo hub 12. In Step S23, a decision is made by decision unit 25a whether or not the acquired current bicycle speed S exceeds the upshift threshold value U(VP) shown in FIG. 4 corresponding to the operating position VP of operating position sensor 26. For example, when internal shifting hub 10 is in second gear (VP=2), the decision will be "Yes" if speed S is faster than 16 km/h. If so, it is then determined in a step S27 whether an upshift flag (FU) has been set (turned on). In this embodiment, upshift flag (FU) is set the first time the acquired speed S exceeds the upshift threshold value U(VP). Setting of upshift flag (FU) can be considered a tentative shift decision such that, if other conditions described below are met, internal shifting hub 10 will be shifted to the next higher gear position.

If it is determined in Step S27 that upshift flag (FU) has not been set, then this is the first time that the acquired speed S exceeds the upshift threshold value U(VP). Accordingly, decision unit 25a sets upshift flag (FU) in a step S28, the number of decision iterations n is set to 1 in a Step S29, and the sensed speed S is set to an $n^{th}$ speed value S(n) in a Step S30 so that the current speed S may be compared with a subsequently sensed speed. Thereafter, processing moves to Step S26.

If it was determined in a Step S27 that the upshift flag (FU) already has been set, then speed S has already exceeded the upshift threshold value U(VP) two or more times in succession. Accordingly, the number of decision iterations n is incremented by 1 in a Step S31, and the sensed speed S is set to the $n^{th}$ speed value S(n) in a Step S32. It is then determined in a Step S33 whether or not the difference between the speed value S(n) indicating the currently sensed speed S and the speed value S(n−1) indicating the immediately prior sensed speed S is greater than a predetermined speed difference SA. This comparison is made to determine whether or not the bicycle is rapidly accelerating. In this embodiment, the predetermined speed difference SA is preferably in a speed range of from approximately 0.3 km to approximately 0.8 km, and more preferably in a speed range of from approximately 0.4 km to approximately 0.6 km. Of course, it is also possible to make the speed difference SA variable according to rider preferences.

If it is determined in Step S33 that the speed difference (S(n)−S(n−1)) is greater than the predetermined speed difference SA (i.e., the bicycle is rapidly accelerating), then canceling unit 25b resets (turns off) upshift flag (FU) in a Step S24, thereby canceling the tentative upshift, and the number of decision iterations n is reset to 0 in a Step S25. It should be noted that canceling unit 25b also resets upshift flag (FU) and resets the number of decision iterations n to 0 whenever it is determined in Step S23 that the current bicycle speed S is less than the upshift threshold value. Thus, the tentative upshift operation is canceled whenever the current bicycle speed falls below the upshift threshold value or whenever the bicycle is rapidly accelerating. Processing then proceeds to Step S26.

On the other hand, if it is determined in Step S33 that the speed difference is less than or equal to the predetermined speed difference SA, it is then determined in a Step S34 whether or not the number of decision iterations n equals a predetermined number of iterations N (10, for example). The predetermined number of iterations N is a variable for determining the timing for upshift and may be set according to the application. If the number of decision iterations n equals the predetermined number of iterations N, it is then determined in a Step S35 whether or not the internal shifting hub 10 currently is in fourth gear. If not, then the operating position VP is incremented by one in a Step S36, and the internal shifting hub 10 is upshifted accordingly. Thereafter, upshift flag (FU) is reset, and the number of decision iterations n is reset to 0 in Steps S24 and S25, respectively.

If it is determined in Step S34 that the number of decision iterations n does not equal the predetermined number of iterations N, then upshifting is considered premature. Also, if it is determined in Step S35 that internal shifting hub 10 currently is in fourth gear, then no further upshifting is possible. Of course, since the upshift threshold value for fourth gear is 255, which would be inconceivable with normal shifting, it is not normal to pass through this step. In any event, no further action is taken to upshift internal shifting hub 10 in either case, and processing moves to Step S26.

In Step S26, it is determined whether or not the acquired current speed S is below the downshift threshold value D(VP) shown in FIG. 4 corresponding to the operating position VP of operating position sensor 26. For example, when internal shifting hub 10 currently is in second gear (VP=2), the decision will be "Yes" if speed S is slower than 12 km/h. If not, then the process returns to the main routine. If so, it is then determined in a Step S37 whether or not internal shifting hub 10 currently is in first gear. If so, then no further downshifting is possible, so the process returns to the main routine. Otherwise, the operating position VP is decremented by one, internal shifting hub 10 is downshifted by one gear, and the process returns to the main routine.

Figure 7:
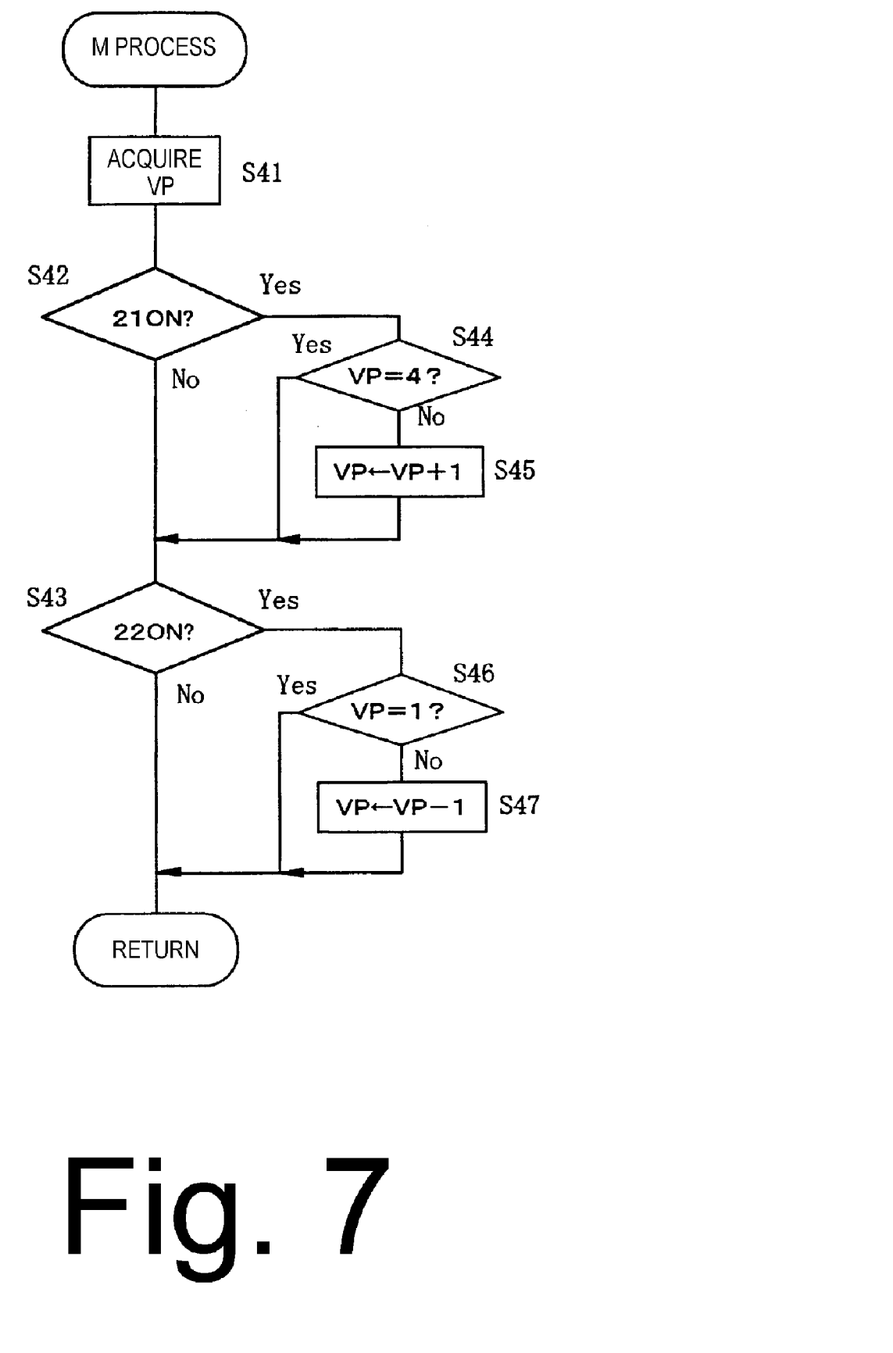
FIG. 7 is a flow chart illustrating a particular embodiment of a manual shift process.

FIG. 7 is a flow chart illustrating a particular embodiment of the manual shifting (M) process of Step S10 in FIG. 5. As shown in FIG. 7, the operating position VP of operating position sensor 26 is acquired in a Step S41. It is then determined in a Step S42 whether or not control button 21 is being operated. If so, it is then determined in a Step S44 whether or not internal shifting hub 10 currently is in fourth gear. If not, then the operating position VP is incremented by one in a Step S45, and the internal shifting hub 10 is upshifted accordingly. On the other hand, if it is determined in Step S44 that internal shifting hub 10 currently is in fourth gear, then no further upshifting is possible. Accordingly, no further action is taken to upshift internal shifting hub 10 at this time, and processing moves to Step S43.

In any event, it is then determined in a Step S43 whether or not control button 22 is being operated. If so, it is then determined in a Step S46 whether or not internal shifting hub 10 currently is in first gear. If not, then the operating position VP is decremented by one in a Step S47, and the internal shifting hub 10 is downshifted accordingly. On the other hand, if it is determined in Step S46 that internal shifting hub 10 currently is in first gear, then no further downshifting is possible. Accordingly, no further action is taken to downshift internal shifting hub 10 at this time, and processing returns to the main routine.

Figure 8A:
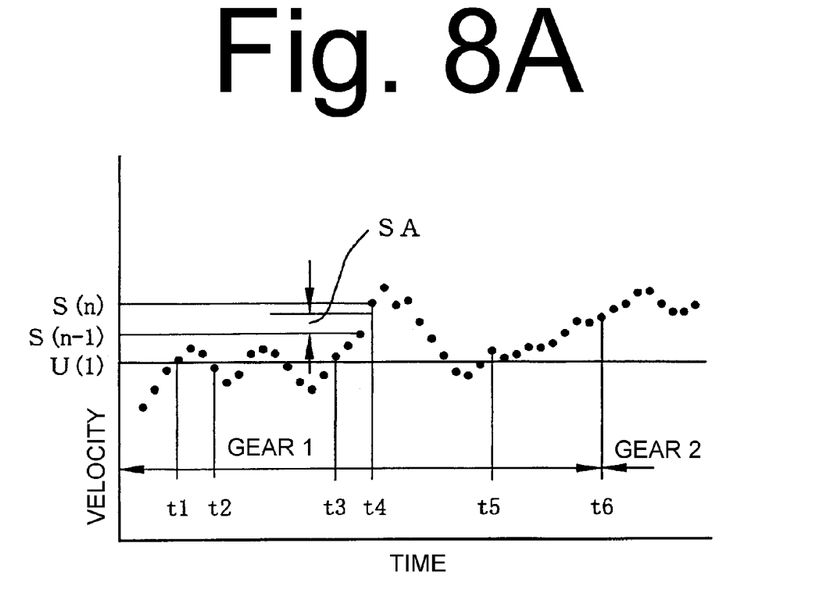
FIG. 8A is a graph illustrating the operation of the disclosed shift control apparatus.
Figure 8B:
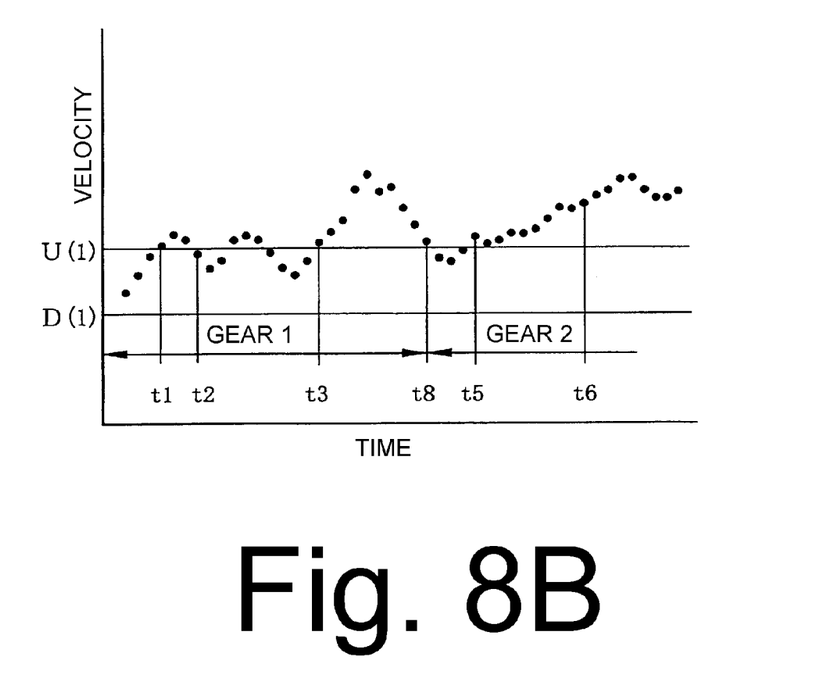
FIG. 8B is a graph illustrating the operation of a conventional shift control apparatus.

FIG. 8A is a graph illustrating the operation of the present shift control apparatus when operating in automatic shifting (A1) mode, for example, and FIG. 8B is a graph illustrating the operation of a conventional shift control apparatus in an automatic shifting mode. In FIGS. 8A and 8B, speed is plotted on the vertical axis, and time is plotted on the horizontal axis. As shown in FIG. 8A, when upshift threshold value U(1) (13 km/h, for example) is exceeded while internal shifting hub 10 is in first gear, subsequent decisions are made to determine whether or not the upshift threshold value U(1) is exceeded a predetermined number of iterations N (10, for example). In the case of FIG. 8A, it is determined that speed S exceeds the upshift threshold value U(VP) at times t1, t3 and t5, for example, whereupon upshift flag (FU) is set to indicate a tentative shift and counting commences. However, at time t2 speed S is below the upshift threshold value U(VP) so the tentative shift is canceled, and upshifting is not performed. At time t4, the difference between the current speed value S(n) and the previous speed value S(n−1) is greater than the predetermined speed difference SA, so again the tentative shift is canceled and upshifting is not performed. At time t6, speed S has exceeded the upshift threshold value U(VP) for N successive iterations, so the bicycle transmission is upshifted up from first gear to second gear.

By contrast, in the conventional case shown in FIG. 8B, if the upshift threshold value U(1) is exceeded consecutively a predetermined number of times, the bicycle transmission is upshifted to second gear without further analysis. Thus, at time t2, upshifting is cancelled in the same manner as in the present apparatus. However, since no difference analysis is performed at time t4, upshifting due to sudden acceleration may occur at time t8, even though the bicycle is decelerating.

While the above is a description of various embodiments of inventive features, further modifications may be employed without departing from the spirit and scope of the present invention. For example, while an internal shifting hub was used as the bicycle transmission in the described embodiment, the disclosed method and apparatus could be applied to an external transmission comprising a derailleur and a plurality of sprockets that rotate with the crank or wheel. While a shift motor was used to shift the bicycle transmission, a solenoid or electrical, hydraulic, or pneumatic cylinder or other such actuator could be used as well.

Figure 9:
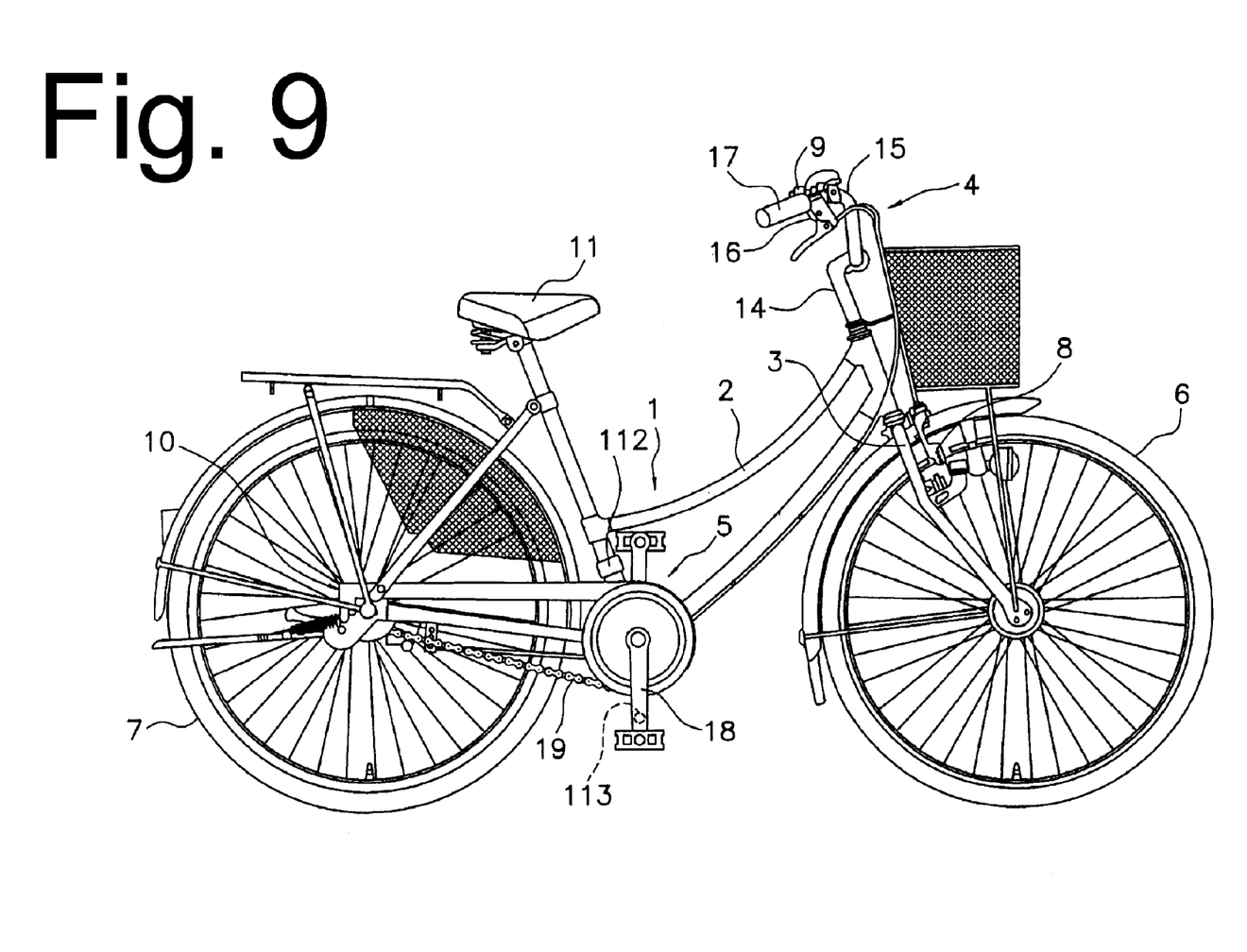
FIG. 9 is a side view of another embodiment of a bicycle.
Figure 10:
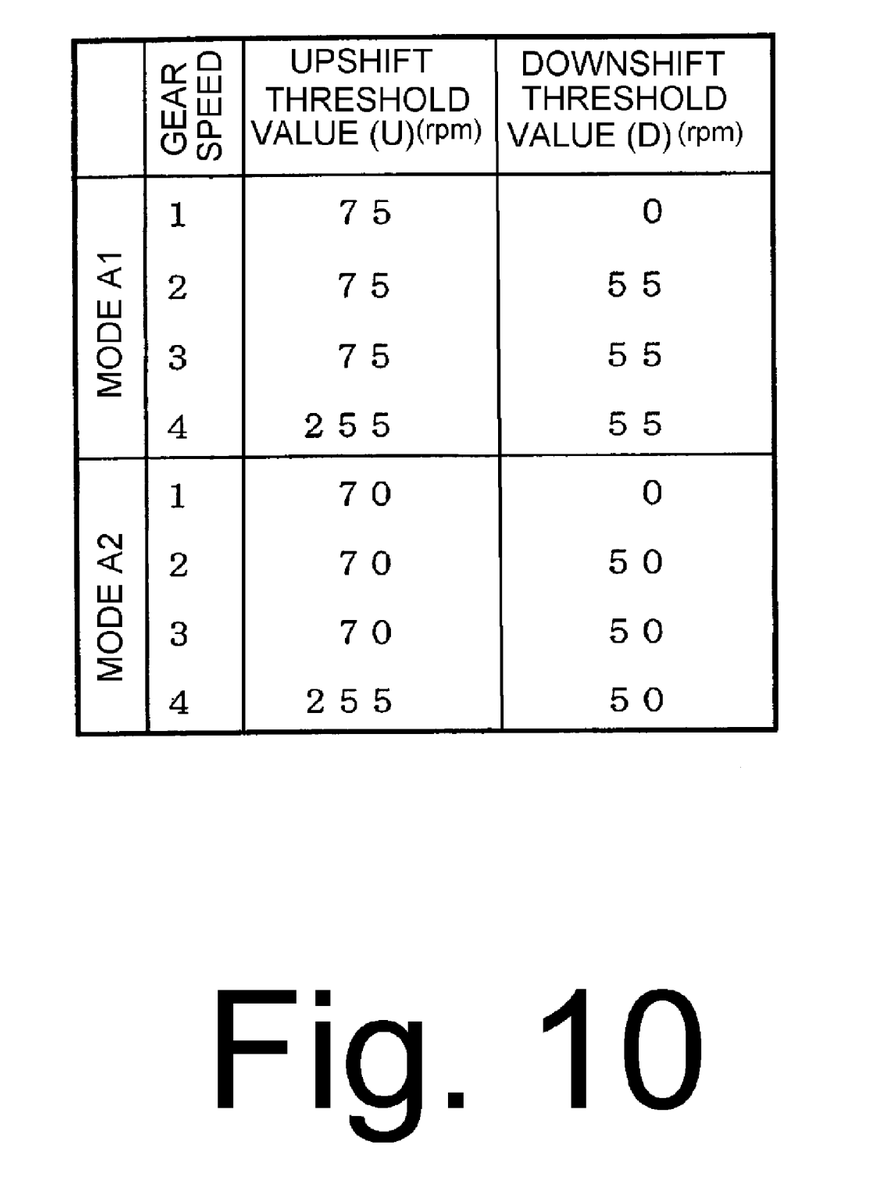
FIG. 10 is a table illustrating a particular embodiment of shift threshold values for the embodiment shown in FIG. 9.

While bicycle speed was used as the sensed riding condition in the disclosed embodiment, crank rotation speed could be used instead. FIG. 9 is a side view of a bicycle that is equipped for that purpose. As shown in FIG. 9, a signal provider 113 such as a magnet may be installed on the gear crank 18 of the bicycle, and a rotation sensor 112 such as a reed switch may be installed on the bicycle frame 2 to sense crank rotation speed. In this case, an upper limit and a lower limit for crank rotation speed for each gear position could be set as shift threshold values as shown in FIG. 10. In this embodiment, the same values are set for each gear position, but different shift threshold values could be provided instead. In automatic shift mode, analogous to the operation shown in FIG. 6, upshifting is performed only when the current crank rotation speed S exceeds the upshift threshold value for the current gear a predetermined number of times and the crank rotation has not accelerated rapidly during that time.

In the above embodiments, upshifting is performed in the event that current bicycle speed or crank rotation speed consecutively exceeds an upshift threshold value U(VP). Alternatively, the system could be modified so that upshifting is performed when current bicycle speed or crank rotation speed continuously exceeds the upshift threshold value U(VP) for a predetermined time interval T1. In the same manner as the described embodiments, if the difference between current and previously sensed bicycle or crank rotation speeds exceeds a predetermined value, a tentatively set shift decision may be canceled. More specifically, rather than setting the number of decision iterations n in Step S29 in FIG. 6 to one, it would be possible to start a timer T and then make a decision whether or not timer T has exceeded time interval T1. Timer T may be reset during initialization, or in Step S25.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle shift control apparatus comprising:
   a threshold value setting unit that sets a threshold value of a running condition for shifting a bicycle transmission;
   a decision unit that decides if a current running condition value passes the threshold value;
   a tentative shift unit that sets a tentative shift of the bicycle transmission when the decision unit decides that the current running condition value passes the threshold value; and
   a canceling unit that cancels the tentative shift if the decision unit decides that the current running condition value varies from a previous running condition value by a determined value.

2. The apparatus according to claim 1 further comprising a control unit that provides a signal to shift the bicycle transmission when the decision unit decides that the current running condition value passes the threshold value a plurality of times.

3. The apparatus according to claim 2 wherein the control unit provides the signal to shift the bicycle transmission when the decision unit decides that the current running condition value passes the threshold value a plurality of times consecutively.

4. The apparatus according to claim 2 wherein the control unit provides a signal to upshift the bicycle transmission when the decision unit decides that the current running condition value passes the threshold value a plurality of times.

5. The apparatus according to claim 4 wherein the control unit provides the signal to upshift the bicycle transmission when the decision unit decides that the current running condition value passes the threshold value a plurality of times consecutively.

6. The apparatus according to claim 4 wherein the control unit immediately provides a signal to downshift the bicycle transmission when the decision unit decides that the current running condition value passes the threshold value.

7. The apparatus according to claim 1 wherein the current running condition comprises bicycle speed.

8. The apparatus according to claim 7 wherein the decision unit is adapted to receive a plurality of the running condition values for a single revolution of a bicycle wheel.

9. The apparatus according to claim 8 wherein the decision unit is adapted to receive the plurality of running condition values from an alternating current generator.

10. The apparatus according to claim 1 wherein the current running condition comprises crank RPM.

11. The apparatus according to claim 1 wherein the decision unit decides whether the current running condition value passes the threshold value for a determined time period.

12. The apparatus according to claim 11 further comprising a control unit that provides a signal to shift the bicycle transmission when the decision unit decides that the current running condition value passes the threshold value for the determined time period.

13. The apparatus according to claim 12 wherein the control unit provides a signal to upshift the bicycle transmission when the decision unit decides that the current running condition value passes the threshold value for the determined time period.

14. The apparatus according to claim 1 wherein the canceling unit cancels the tentative shift if the decision unit decides that the current running condition value exceeds the previous running condition value by the determined value.

15. The apparatus according to claim 1 wherein the threshold value setting unit sets an upshift threshold value and a downshift threshold value, wherein the tentative shift unit sets a tentative upshift of the bicycle transmission when the decision unit decides that the current running condition value passes the upshift threshold value, wherein the canceling unit cancels the tentative upshift if the decision unit decides that the current running condition value varies from the previous running condition value by the determined value, and further comprising:
   a first control unit that provides a signal to upshift the bicycle transmission when the decision unit decides that the current running condition value passes the upshift threshold value a plurality of times; and
   a second control unit that provides a signal to downshift the bicycle transmission when the decision unit decides that the current running condition value passes the downshift threshold value.

16. The apparatus according to claim 15 wherein the first control unit provides the signal to upshift the bicycle transmission when the decision unit decides that the current running condition value passes the upshift threshold value a plurality of times consecutively.

17. The apparatus according to claim 15 wherein the decision unit decides whether the current running condition value passes the upshift threshold value for a determined time period.

18. The apparatus according to claim 17 wherein the first control unit provides the signal to upshift the bicycle transmission when the decision unit decides that the current running condition value passes the upshift threshold value for the determined time period.

19. The apparatus according to claim 15 wherein the second control unit immediately provides a signal to downshift the bicycle transmission when the decision unit decides that the current running condition value passes the downshift threshold value.

20. The apparatus according to claim 15 wherein the current running condition comprises bicycle speed.

21. The apparatus according to claim 15 wherein the current running condition comprises crank RPM.

* * * * *